United States Patent [19]

Appel et al.

[11] 4,186,600
[45] Feb. 5, 1980

[54] MAGNET SYSTEM FOR ELECTROMAGNETIC FLOWMETER

[75] Inventors: Eggert Appel, Dransfeld; Herbert Gehrke, Rosdorf; Wilfried Kiene, Hedemünden, all of Fed. Rep. of Germany

[73] Assignee: Fischer & Porter Co., Warminster, Pa.

[21] Appl. No.: 948,222

[22] Filed: Oct. 3, 1978

[30] Foreign Application Priority Data

Oct. 5, 1977 [DE] Fed. Rep. of Germany ....... 2744865

[51] Int. Cl.² .................................................. G01F 1/58
[52] U.S. Cl. .................................................. 73/194 EM
[58] Field of Search ............ 73/194 EM; 310/11, 155, 310/181

[56] References Cited

U.S. PATENT DOCUMENTS

| | | | |
|---|---|---|---|
| 2,929,247 | 3/1960 | Sturgeon | 73/194 EM |
| 3,490,282 | 1/1970 | Wada | 73/194 EM |
| 3,827,298 | 8/1974 | Kawamata et al. | 73/194 EM |

Primary Examiner—Jerry W. Myracle
Attorney, Agent, or Firm—Ebert, Michael

[57] ABSTRACT

An electromagnetic flowmeter in which a fluid to be metered is conducted through a flow tube formed of a non-magnetizable, weldable metal pipe having an insulating liner therein and provided with a pair of diametrically-opposed electrodes. The fluid passing through the tube intercepts a magnetic field to induce a signal in the electrodes indicative of flow rate. The magnetic field is established by a magnet system excited by a low-frequency alternating or pulsating current, the system including at least one solid core of ferromagnetic material about which is wound an excitation coil. The core has its inner face welded to the outer surface of the pipe to provide a highly stable magnet system.

4 Claims, 4 Drawing Figures

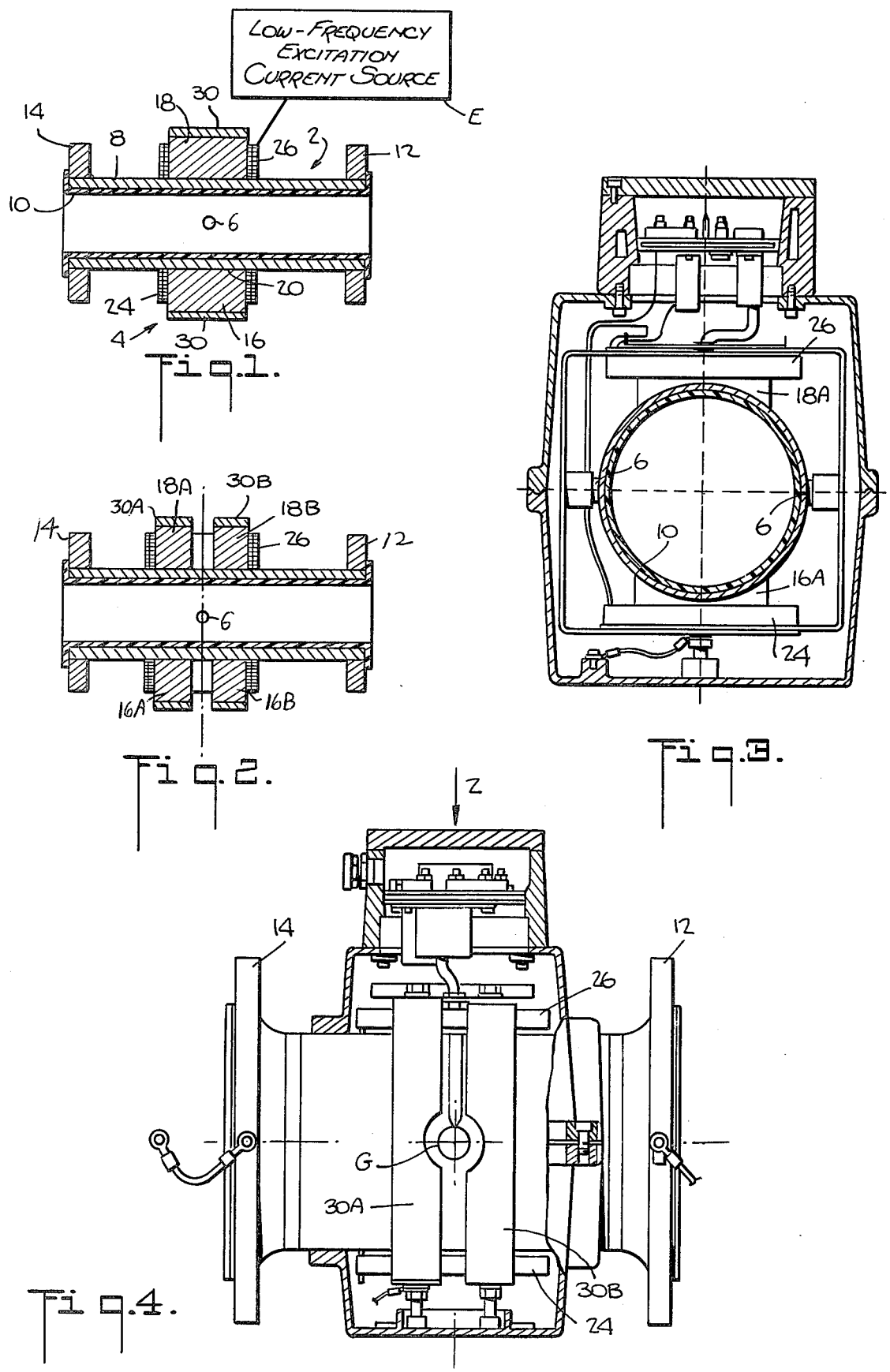

MAGNET SYSTEM FOR ELECTROMAGNETIC FLOWMETER

BACKGROUND OF INVENTION

This invention relates generally to electromagnetic flowmeters, and more particularly to a flowmeter whose magnet system includes at least one solid ferromagnetic core welded to the outer surface of the metal flow pipe.

An electromagnetic flowmeter is adapted to measure the volumetric flow rate of a fluid, particularly fluids which present difficult handling problems such as corrosive acids, slurries, detergents and the like. In a meter of this type, a magnetic field is generated which is mutually perpendicular to the longitudinal axis of the flow tube through which flows the fluid to be metered and to the axis of the meter electrodes.

Since the velocity of the fluid is directed along the longitudinal axis of the flow tube, the voltage induced within the fluid will be perpendicular to both the velocity of this fluid and the flux linkages of the magnetic field. Thus the metered fluid consitutes a series of fluid conductors moving through the magnetic field. The more rapid the rate of flow, the greater the instantaneous value of voltage developed at the electrodes, thereby producing an output signal representative of flow rate.

As noted in the Mannherz et al U.S. Pat. No. 3,596,104, one well-known type of electromagnetic flowmeter in widespread commercial use includes a stainless steel flow pipe whose inner surface is lined with an insulating material such as Teflon, neoprene or vitreous enamel, depending on the anticipated nature of the fluid being measured. Two electrodes are mounted at diametrically-opposed positions on the central portion of the flow pipe, the electrodes being insulated from the metal pipe by bushings. The faces of the electrodes are flush with the inner surface of the insulating liner and come in contact with the fluid being metered.

As noted in the Seebode, et al U.S. Pat. No. 3,926,049, to overcome polarizing effects, it is known to excite the magnet system of an electromagnetic flowmeter with an alternating current. However, as a consequence of such AC excitation, undesirable eddy currents are generated.

In the conventional electromagnetic flowmeter of the type described for example in the Mannherz et al patent, the magnet system to establish the magnetic field consists of two saddle-shaped magnet coils surrounded by a box-shaped laminated iron core which in turn completely encompasses the central portion of the flowmeter, the laminated core serving to minimize eddy current effects.

In electromagnetic flowmeters whose magnet system makes use of laminated cores, the core laminae are glued or otherwise held together, and the magnet system is screwed onto the metal flow tube by means of holders. In the course of operation, the laminae of the core tend to be set into mechanical oscillation at the frequency of the excitation current. As a result, there is danger that the laminae of the core may be loosened and displaced relative to each other and with respect to the flow tube to which they are attached by holders, thereby producing objectionable noise. Moreover, temperature effects arising from the temperature of the fluid being measured may also serve to displace the magnet system.

As a consequence of such displacement the calibration of the magnet systems may be impaired and cause spurious interference signals to be generated which degrade the accuracy of the meter. In order to minimize these adverse effects, special expedients have heretofore been provided for mounting the magnet system on the flow tube to obviate displacement thereof. Such expedients not only complicate the structure of the meter, but are quite expensive.

SUMMARY OF INVENTION

In view of the foregoing, the main object of this invention is to provide an electromagnetic flowmeter whose magnet system is excited by a low-frequency alternating or pulsating current, thereby minimizing the production of eddy currents and making possible the use of a non-laminated magnetic core which is permanently secured to the metal flow pipe to avoid displacement of the magnet system and to maintain the calibration of the meter.

The use of a low-frequency excitation current for the magnet system of an electromagnetic flowmeter is per se, already known, but such low-frequency excitation systems have heretofore been used with laminated cores.

A significant advantage of a magnet system in accordance with the invention is that it is of simple, low cost design and yet affords a reliable, efficient and accurate flowmeter operation. Thus the invention does away with the need to stamp out metal sheets and to stack the sheets in layers to produce laminae, as well as the need for expensive laminated core holders.

More particularly, it is an object of this invention to provide a highly stable magnet system for an electromagnetic flowmeter in which the cores of the system are directly welded to the metal flow pipe, the cores being preferably constituted by a solid body of standard or cast steel shaped into pole shoes.

Briefly stated, these objects are attained in an electromagnetic flowmeter whose flow tube is constituted by a non-magnetizable, weldable metal pipe having an insulating liner therein and provided with a pair of diametrically-opposed electrodes, the fluid passing through the flow tube intercepting a magnetic field produced by a magnet system which is excited by a low-frequency alternating or pulsating current.

The magnet system includes at least one solid core of ferromagnetic material about which is wound an excitation coil. The core has the shape of a pole shoe whose inner face is welded to the outer surface of the metal pipe to provide a high stable magnet system.

OUTLINE OF THE DRAWINGS

For a better understanding of the invention as well as other objects and further features thereof, reference is made to the following detailed description to be read in conjunction with the accompanying drawings, wherein:

FIG. 1 is a longitudinal section taken through an electromagnetic flowmeter, shown schematically, having a magnet system in accordance with one preferred embodiment of the invention;

FIG. 2 is a section taken through the flowmeter, illustrating a second preferred embodiment of the magnet system;

FIG. 3 is a longitudinal section of the actual structure of a flowmeter which incorporates the second embodiment of the magnet system; and FIG. 4 is a transverse section of the actual structure taken in the plane indicated by arrow Z in FIG. 3.

DESCRIPTION OF INVENTION

First Embodiment

Referring now to FIG. 1, there is shown an electromagnetic flowmeter which includes a generally cylindrical flow tube 2 having a metal pipe component 8 preferably fabricated of chromium nickel steel or any other suitable non-magnetizable, weldable metal, and an inner liner component 10 serving as a protective lining for the outer component and fabricated of insulating material such as Teflon. Pipe 8 is provided at either end with mounting flanges 12 and 14, the end portions of liner 10 being extended and folded over to partially overlie the faces of the flange.

Flow tube 2 is provided with a pair of diametrically-opposed electrodes, one of which 6 is shown in FIG. 1, whereby fluid flowing through the flow tube intercepts a magnetic field established therein by a low-frequency alternating or pulsating current derived from a source E and fed to the magnet system of the meter to induce a signal in the electrodes which varies as a function of flow rate. The low-frequency excitation source may be of the type disclosed in the Torimaru U.S. Pat. No. 4,059,014.

A magnet system generally designated by numeral 4 is provided, the system being constituted by a pair of non-laminated cores 16 and 18 secured to pipe 8 at diametrically-opposed positions, cores 16 and 18 having excitation coils 24 and 26 wound respectively thereon.

Cores 16 and 18 are preferably fabricated of solid standard or cast steel and are shaped into pole shoes, the inner faces of which are welded to the outer surface of metal pipe 8 of flow tube 2. The outer faces of cores 16 and 18 are magnetically interconnected by a massive yoke or strap 30 providing a flux return path.

Thus the magnet system which is directly welded to pipe 8 is extremely stable. Its position relative to the electrodes is fixed and never varies, thereby avoiding the need for special holders and other expedients heretofore provided to resist displacement of the magnet system.

Second Embodiment

In this embodiment, instead of a single core (16, 18) on opposing sides of pipe 8 as in FIG. 1, a pair of cores sections 16A–16B and 18A and 18B as shown in FIG. 2 is provided. The core sections are spaced from each other symmetrically with respect to the central transverse plane P of the flowmeter which intersects the electrode axis, thereby characterizing the resultant magnetic field.

Excitation coil 24 is, in this instance, wound about core pair 16A–16B, while excitation coil 26 is wound about core pair 18A–18B. The inner faces of the core pairs are welded to pipe 8, whereas the outer faces of core sections 16A and 18A are interconnected by a yoke 30A and the outer faces of core sections 16B and 18B by a yoke 30B.

An actual embodiment of this double core arrangement is shown in FIGS. 3 and 4.

While there have been shown and described preferred embodiments of an improved magnet system for electromagnetic flowmeter in accordance with the invention, it will be appreciated that many changes and modifications may be made therein without, however, departing from the essential spirit thereof.

We claim:

1. An electromagnetic flowmeter comprising:
   A. a flow tube constituted by an outer pipe component formed of a non-magnetizable, weldable metal and an inner liner component protectively lining the pipe formed of electrically insulating material;
   B. a pair of electrodes mounted at diametrically-opposed positions on said flow tube; and
   C. a magnet system excitable by a low-frequency current source to establish a magnetic field in said flow tube which is intercepted by a fluid to be metered to induce a signal in said electrodes indicative of its flow rate, the system including at least one solid core of ferromagnetic material about which is wound an excitation coil through which said current flows, the frequency of said current being well below the frequency of a standard a-c power line whereby the production of eddy currents in said core is minimized, said core having the shape of a pole shoe whose inner face is welded to the outer surface of said pipe to provide a stable magnetic system, said system being formed by two cores disposed at opposite positions on said pipe and welded thereto at their inner faces, the outer faces of said cores being interconnected by a flux return strap.

2. A flowmeter as set forth in claim 1, wherein said pole shoe is formed of steel.

3. A flowmeter as set forth in claim 1, wherein said pipe is formed of chromium nickel steel.

4. A flowmeter as set forth in claim 1 wherein each of the two cores is constituted by a pair of core sections, the sections in each pair being spaced from each other and being equidistant with respect to a transverse plane intersecting an axis extending through the electrodes whereby the core sections are symmetrically-disposed relative to the electrodes.

* * * * *